United States Patent

[11] 3,591,264

[72] Inventors Robert L. Forrest
  10911 Hunting Horn Drive, Santa Ana, Calif. 92705;
  Rush T. Hilborn, 433 Via Lido Soud, Newport Beach, Calif. 92660
[21] Appl. No. 825,341
[22] Filed May 16, 1969
[45] Patented July 6, 1971

[54] READING LENSES ADHESIVELY ATTACHED TO LOWER EYELIDS
  3 Claims, 6 Drawing Figs.
[52] U.S. Cl. ..................................................... 351/159, 351/160, 351/61
[51] Int. Cl. ..................................................... G02c 7/02, G02c 7/04
[50] Field of Search ........................................... 351/160, 161, 159, 61

[56] References Cited
UNITED STATES PATENTS
2,079,256   5/1937   Kaiser .......................... 132/53
2,862,509  12/1958   Porte ............................ 132/53
3,102,157   8/1963   Gamber ......................... 351/160

FOREIGN PATENTS
1,217,230  12/1959   France ......................... 351/160

OTHER REFERENCES
THE OPTICIAN, Vol. XCV, May 27, 1938, pg. 311 cited, Copy in 351/44
Akiyama Article in CONTACTO Vol. 4, No. 5, May, 1960, pp. 149— 152 cited, Copy in 351/160

Primary Examiner—David H. Rubin
Attorney—Gausewitz and Carr

ABSTRACT: The disclosure relates to lenses adapted to be used for reading and similar close-vision purposes by individuals having defective vision, namely, presbyopia or other refractive error. The lenses are sufficiently small that when they are mounted on the lower eyelids, out of contact with the corneas, the wearer may look over the tops of the lenses at distant objects. The lenses are combined with mounting means adapted to effect adhesive mounting of the lower lens portions onto the upper margins of the lower eyelids. The disclosure further relates to a method of mounting such lenses before the eyes of persons having defective vision.

PATENTED JUL 6 1971 3,591,264
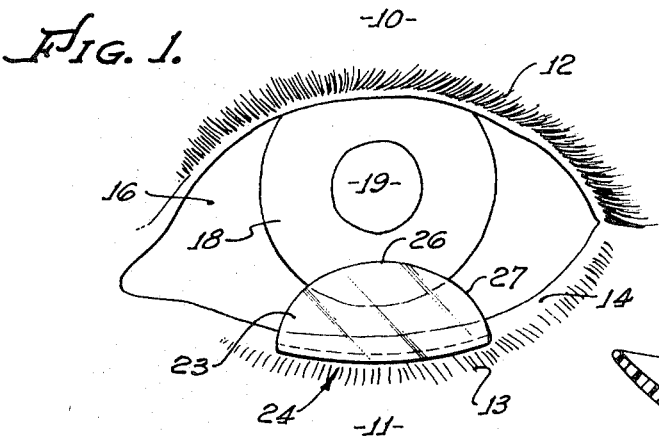
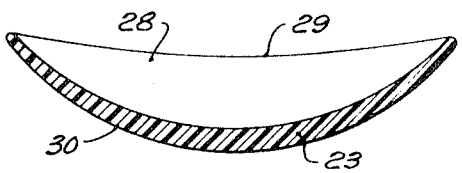
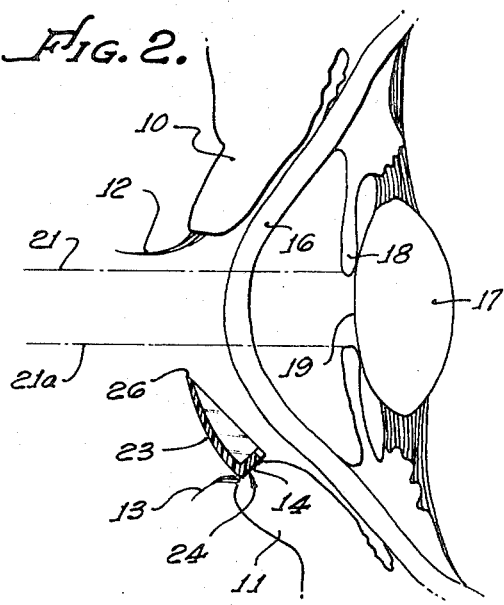
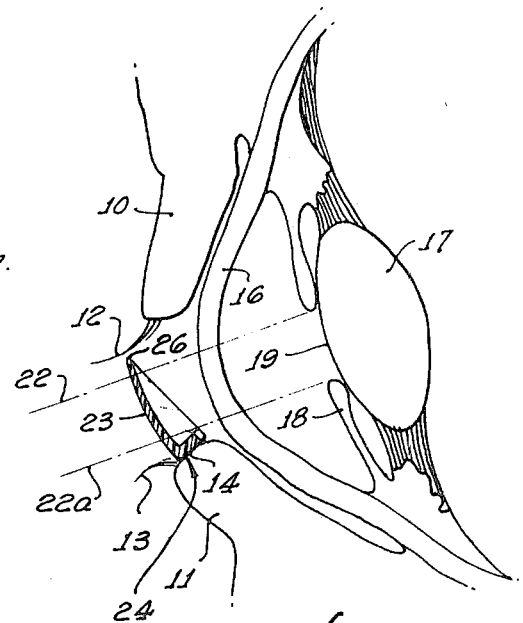
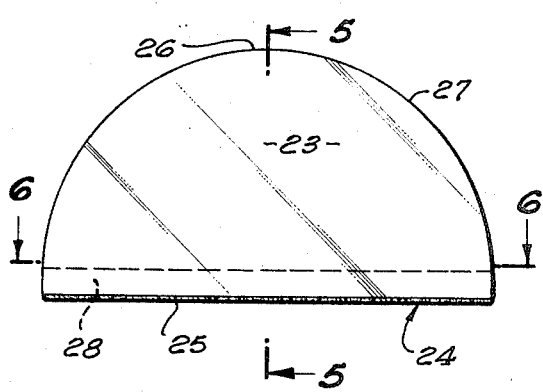
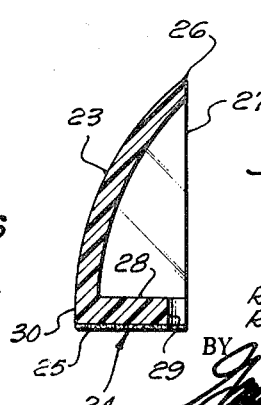
INVENTORS.
ROBERT L. FORREST
RUSH T. HILBORN
BY
ATTORNEYS.

READING LENSES ADHESIVELY ATTACHED TO LOWER EYELIDS

BACKGROUND OF THE INVENTION

1. Field of the Invention

This invention relates to the field of lenses adapted to correct defects of vision, and to be mounted relatively permanently before the eyes of the wearer so that they will always be available when it is desired to read or to look at close objects.

2. Description of the Prior Art

It has long been known to mount false eyelashes onto the eyelids of an individual by means of adhesives. Patents showing such eyelashes include U.S. Pats. Nos. 2,079,256 and 2,862,509. There also exist large numbers of patents which teach the mounting of lenses on the eyes of individuals by positioning peripheral portions of the lenses between the eyelids and in contact with the adjacent corneas. Patents of this type include U.S. Pats. Nos. 2,347,488, 3,102,157, and French Pat. No. 1,217,230. The latter patent also teaches the mounting of lenses by means of small suction cups which are applied to the exterior surfaces of the eyelids and/or to exterior regions adjacent the corners of the eyes.

The above references do not teach or suggest reading lenses which may be mounted relatively permanently by adhesive attachment to the upper marginal edges of the lower eyelids, which do not contact the corneas, which do not interfere with distance vision, which do not prevent closing of the eyes, squinting, etc., and which do not detract substantially from the beauty or attractiveness of the eyes of the user.

SUMMARY OF THE INVENTION

The invention comprises small corrective lenses adapted to be used for reading purposes by individuals having defects of vision, such as presbyopia, in combination with means to effect adhesive mounting of such lenses on the upper marginal edges of the lower eyelids and in spaced relationship from the corneas. The upper edge portions of the lenses are spaced sufficiently far from the adjacent portions of the corneas to permit the upper eyelids to pass downwardly between the lenses and the corneas, so that the wearer may close his eyes. Such upper edge portions of the lenses are disposed at elevations sufficiently low, relative to the pupils, that the wearer may look in a forward direction (for example, at distant objects) without substantial interference from the lenses. The invention further comprises a method of mounting such lenses on the lower eyelids by means of adhesive and in such manner that the lenses are spaced from the corneas, the adhesive being secured only to the upper marginal edges of the lower eyelids and in some cases to the adjacent regions of the base portions of the lower eyelashes.

BRIEF DESCRIPTION OF THE DRAWING

FIG. 1 is a front elevational view showing a lens constructed and mounted in accordance with the present invention;

FIG. 2 is a vertical sectional view through the lens and through the eye, illustrating the fact that the wearer may look at distant objects over the upper portion of the lens without interference thereby;

FIG. 3 is a view corresponding to FIG. 2 but illustrating an eye position whereby the wearer is looking through the lens at reading matter or at other close objects;

FIG. 4 is a front elevational view of the lens;

FIG. 5 is a vertical sectional view along 5–5 of FIG. 4; and

FIG. 6 is a horizontal sectional view along 6–6 of FIG. 4.

DESCRIPTION OF THE PREFERRED EMBODIMENT

Referring first to FIGS. 1–3, the various parts of a human eye will first be referred to in order that the present reading lenses, and method of mounting the same, may be clearly understood. The upper and lower eyelids are indicated, respectively at 10 and 11. The upper and lower eyelashes are shown, respectively, at 12 and 13. The upper marginal edge of lower eyelid 11 is denoted by the reference numeral 14, being generally perpendicular to the portion of the cornea 16 which is adjacent to such edge. Edge 14 is normally smooth and devoid of hair, since the base portions of lower lashes 13 are located only in the region of edge 14 remote from the cornea.

In addition to cornea 16, the eye has a lens 17 and an iris 18. The pupil or opening 19 in iris 18 is spaced a substantial distance above edge 14 of lower lid 11. Accordingly, when the eye is looking directly forwardly as shown in FIG. 2, horizontal light rays 21 and 21a which pass through the pupil 19 and lens 17 are also spaced a substantial distance above lid edge 14. However, when the eye is tilted downwardly (without correspondingly tilting the head) as illustrated in FIG. 3, for example during reading, inclined light rays 22 and 22a which pass through pupil 19 and lens 17 are much closer to margin or edge 14. The lower inclined light ray 22a shown in FIG. 3 passes quite close to edge 14.

Each of the lenses may be described generally as comprising a reading lens portion 23 so constructed as to aid the wearer in reading a book, small print, etc. The lens 23 is sufficiently small that it will fit readily in the space between the adjacent edges of the upper and lower eyelids 10 and 11. Each lens has associated therewith a mounting portion 24 which includes adhesive means 25 for mounting of the lens 23 on the above-specified marginal edge 14 of lower lid 11. Primarily, the mounting is effected on the hair-free central and inner regions of marginal edge 14, although mounting may also be effected in part over the base portion of lower lashes 13.

The construction and mounting of each lens 23 are such that it is spaced from cornea 16 a distance sufficient to insure against contact therewith, and also to permit unimpeded flow of tears between the lens and the cornea. The construction and mounting of the lens 23 are also such that the lens approximates an extension (although a transparent one) of lower lid 11, as distinguished from being transverse to the lower lid. Thus, in FIGS. 2 and 3, the lower lid 11 is illustrated as extending upwardly and to the left, and the lens 23 correspondingly extends upwardly and to the left (at generally the same angle) from the upper marginal edge 14 of the lower lid.

The lens 23 is sufficiently small that the extreme zenith portion 26 thereof is below the line of vision of the wearer when he is looking forwardly at a distant object as shown in FIG. 2, for example. A lower horizontal light ray 21a traveling from a distant object through the lower region of pupil 19 is then above the zenith portion 26 (thus, zenith 26 is then below the lower region of the pupil).

On the other hand, the lens is sufficiently large that inclined light rays 22 and 22a (FIG. 3) passing from a book, etc., through pupil 19 (when the eye is rotated downwardly, will pass through the lens 23 to provide the desired vision-correction action. It is emphasized that the extreme closeness of the lens to the cornea 16 (although without touching the cornea) permits the lens to be small while still affording the wearer a substantial field of corrected vision during reading or the like.

As shown in FIG. 1, the horizontal dimension of the lens is much less than the horizontal dimension of the eye, but is normally substantially greater than (for example, double) the vertical dimension of the lens. In a typical lens of the present type, the horizontal dimension is about one-half inch, whereas the vertical dimension (including the mounting flange described below) is approximately one-fourth inch.

Although, as stated above, the lens is close to cornea 16 in order that a wide field of vision will be achieved with a small lens 23, it is not so close that the closing of the eye is prevented. Referring to FIG. 3, it will be seen that further downward movement of upper lid 10 will cause the same to pass downwardly between lens 23 and cornea 16 until the eye is closed. The upper eyelashes 12 will then flex upwardly and not interfere in any substantial manner with the indicated closing of the eye.

Referring particularly to FIGS. 4—6, the specific construction of the illustrated lens 23 is concavo-convex, the concave side being relatively adjacent cornea 16. The upper edge 27 of the lens (having the previously indicated zenith portion 26) is substantially semicircular and lies generally in a single plane. The lower portion of lens 23 is cut off generally in a plane which is perpendicular to the plane containing edge 27.

Provided in such last-mentioned perpendicular plane is an inwardly (toward cornea 16) extending flange or web 28 forming a major part of the mounting portion 24. As shown in FIG. 6, the illustrated flange or web 28 is generally crescent-shaped, the edge 29 adjacent cornea 16 being concave and the region 30 remote from cornea 16 being convex. Flange 28 extends generally along a diameter of the semicircular upper edge 27 of the lens, and is between the lower edge of the lens and the plane containing semicircular lens edge 27. The flange 28 and lens 23 are preferably integral with each other, and are formed of a suitable synthetic resin of a relatively unbreakable nature.

The remainder of the mounting portion 24 comprises the above-indicated adhesive means 25. This preferably consists of a suitable pressure-sensitive adhesive secured to the bottom surface of flange or web 28 as shown in FIGS. 4 and 5. The pressure-sensitive adhesive may be applied in liquid form, or it may comprise a layer of flexible plastic having layers of pressure-sensitive adhesive preapplied to both surfaces thereof. One adhesive layer is then employed to secure the flexible plastic to the undersurface of flange 28, whereas the other layer is employed to secure the flange 28 to the marginal edge portion 14 of lower lid 11.

In accordance with one desirable method of applying the adhesive, a large number of the specified flexible plastic elements containing adhesive on both faces thereof are precut to correspond generally to the crescent shape (FIG. 6) of flange 28. These elements are then mounted in a book containing a number of pages of a release material to which the pressure-sensitive adhesive does not readily adhere. It is then a simple matter for the user to press the flange 28 against a corresponding adhesive element in the book, and then lift to cause detachment of such adhesive element from the release material.

The length of the crescent-shaped flange 28 may be, as indicated above, on the order of about one-half inch. The width thereof may be on the order of one-sixteenth inch or three-thirty-second inch at its widest point. Such width is sufficient to maintain the lens 23 properly oriented relative to lid margin 14, etc. as specified above.

To summarize the method of mounting, the described lens 23 having a mounting portion 24 including flange or web 28 is provided with suitable adhesive 25 which is preferably pressure sensitive. Alternatively, adhesive may be preapplied to marginal edge 14 of lower lid 11. The combination of lens 23 and flange 28 is then mounted on the lower marginal edge 14 in generally the central region thereof, the position being such that when the viewer looks downwardly he may see reading material, etc., through the lens 23 so that correction of his vision is achieved. Normally lens 23 is magnifying in nature.

The lens is worn for long periods of time, being normally put on in the morning and removed each evening. As specified above relative to FIG. 2, the lens does not interfere with normal straight-ahead vision of distant objects or even relatively near objects, but the lens is always available for reading (magnifying) purposes when the wearer tilts his eyes (not his head) downwardly as indicated relative to FIG. 3. As above stated, the lens does not interfere with closing of the upper eyelid, nor with normal flow of tears.

When the wearer is looking at distant objects, he looks straight ahead and maintains his eyes fully open as shown in FIG. 2. When he desires to look at reading material or the like, he tilts his eyeballs downwardly somewhat (FIG. 3) and (normally) causes his upper eyelids 10 to move downwardly. Vision is thus through the lens 23, as above described. It is to be noted that FIGS. 2 and 3 show eye positions in a head (not shown) which is not tilted but instead has the same erect position relative to both figures. Thus, as above indicated, the wearer tilts his eyes but not his head when it is desired to read.

The lens is so small that it is not readily apparent to anyone looking at the person wearing the lens. Thus, the wearer achieves the benefit of good vision of reading matter without wearing unsightly glasses and constantly putting them on and taking them off, without using bifocals without interfering with normal vision of distant objects, etc. The field of vision achieved through the lens when the eye is in the FIG. 3 position is, as above stated, surprisingly wide because of the fact that the lens is so near the cornea 16. On the other hand, the wearer need not achieve tolerance (as is necessary with contact lenses) since there is no contact with the cornea 16.

Although flange 28 and the lower portion of lens 23 are described herein as lying in a plane, they may be made somewhat downwardly convex in order to conform closely to various shapes of lid margins 14.

We claim:
1. A lens device for compensating for defects of vision, which comprises:
a lens shaped to compensate for defects in the vision of a human eye,
said lens being sufficiently small that it will fit in the space between the adjacent marginal edges of the upper and lower eyelids of said eye with the upper edge spaced from the upper eyelid so that the wearer may view distant objects without looking through the lens, and
means to mount said lens to only said lower eyelid and in a position between said eyelid edges and spaced forwardly from the cornea of said eye,
said mounting means including adhesive means adherent to said lower eyelid,
said lens being concavo-convex and having a generally semicircular upper edge lying generally in a single plane, said lens being adapted to effect magnification for viewing close objects, said mounting means including a horizontal flange extending inwardly from the lower edge of said lens for attachment in conforming relationship to the surface of the upper marginal edge of said lower eyelid, said lower edge being generally along a diameter of said semicircular upper edge, said flange extending generally toward said plane of said upper edge and toward the cornea and being generally crescent-shaped in outline, said adhesive means being provided on the lower surface of said flange, whereby the lens is entirely supported by adhesive attachment of said flange to the upper marginal edge of said lower eyelid with the upper edge portion spaced sufficiently far from the adjacent portion of the cornea to permit the upper eyelid to pass downwardly between the lens and the cornea during eye closure.

2. The invention as claimed in claim 1, in which said adhesive means is a pressure-sensitive adhesive.

3. The invention as claimed in claim 1, in which said lens has a horizontal dimension on the order of one-half inch, and a vertical dimension on the order of one-fourth inch.